(12) United States Patent
Fan et al.

(10) Patent No.: US 7,969,699 B2
(45) Date of Patent: Jun. 28, 2011

(54) ESD PROTECTION TRIGGER CIRCUIT

(75) Inventors: Tso-Hung Fan, Hsinchu (TW); Kuo-Ji Chen, Wu-Ku (TW)

(73) Assignee: Taiwan Semiconductor Manufacturing Co., Ltd., Hsin-chu (TW)

(*) Notice: Subject to any disclaimer, the term of this patent is extended or adjusted under 35 U.S.C. 154(b) by 344 days.

(21) Appl. No.: 12/186,400

(22) Filed: Aug. 5, 2008

(65) Prior Publication Data

US 2010/0033884 A1 Feb. 11, 2010

(51) Int. Cl.
*H02H 9/00* (2006.01)
(52) U.S. Cl. .......................................................... 361/56
(58) Field of Classification Search .................... 361/56
See application file for complete search history.

(56) References Cited

U.S. PATENT DOCUMENTS

| | | | | |
|---|---|---|---|---|
| 5,559,659 A * | 9/1996 | Strauss | | 361/56 |
| 6,552,886 B1 * | 4/2003 | Wu et al. | | 361/56 |
| 6,643,109 B1 * | 11/2003 | Li et al. | | 361/56 |
| 6,965,503 B2 * | 11/2005 | Connor et al. | | 361/56 |
| 6,989,979 B1 * | 1/2006 | Tong et al. | | 361/91.1 |
| 7,085,113 B2 * | 8/2006 | Gauthier et al. | | 361/56 |
| 7,098,717 B2 * | 8/2006 | Watt | | 327/313 |
| 7,295,411 B2 * | 11/2007 | Arai et al. | | 361/56 |
| 7,423,855 B2 * | 9/2008 | Fankhauser et al. | | 361/56 |
| 7,453,676 B2 * | 11/2008 | Huh | | 361/56 |
| 7,619,862 B2 * | 11/2009 | Hung | | 361/56 |
| 7,692,905 B2 * | 4/2010 | Hung | | 361/56 |
| 2007/0171587 A1 * | 7/2007 | Lee et al. | | 361/56 |
| 2008/0055805 A1 * | 3/2008 | Pong et al. | | 361/56 |
| 2010/0033884 A1 * | 2/2010 | Fan et al. | | 361/56 |
| 2010/0142105 A1 * | 6/2010 | Linten et al. | | 361/56 |

* cited by examiner

*Primary Examiner* — Ronald W Leja
(74) *Attorney, Agent, or Firm* — K&L Gates LLP

(57) ABSTRACT

This invention discloses a trigger circuit for an electrostatic discharge (ESD) protection device, the ESD protection device being turned on during an ESD event and being turned off during a normal operation, the trigger circuit comprises a voltage sensing circuit coupled to a bonding pad, the voltage sensing circuit being configured to produce a first predetermined voltage during a ESD event, and to produce a second predetermined voltage complimentary to the first predetermined voltage during a normal operation, and a voltage converting circuit having a positive feedback circuit and coupled between the voltage sensing circuit and the ESD protection device for converting the first predetermined voltage to a third predetermined voltage for turning on the ESD protection device, and for converting the second predetermined voltage to a fourth predetermined voltage for turning off the ESD protection device.

5 Claims, 3 Drawing Sheets

ESD PROTECTION TRIGGER CIRCUIT

BACKGROUND

The present invention relates generally to integrated circuit (IC) design, and, more particularly, to an electrostatic discharge (ESD) trigger circuit design.

Static electricity exists on the surfaces of many materials. When bodies of different potential come into contact, electrostatic discharge (ESD) will occur. In semiconductor devices, such ESD can change the electrical characteristics of a semiconductor device, degrading or destroying them. Therefore, semiconductor devices all have ESD protection circuits on their bonding pads. Such ESD protection circuits, essentially, comprise a large discharge path triggered open only by an excessive potential, i.e., an electrostatic discharge event.

FIG. 1 illustrates a conventional ESD protection circuit 100 which comprises a voltage sensing circuit 110, an inverter 123, and an ESD protection device 130. The voltage sensing circuit 110 is comprised of a resistor 112 and a capacitor 114 that are serially connected between a bonding pad 102 under protection and a ground VSS. The capacitor 114 is implemented by a NMOS transistor with a source and a drain tied together to the VSS. The ESD protection device 130 is a large NMOS transistor with a source and a drain connected to the bonding pad 102 and the VSS, respectively. Large NMOS transistors being used for the ESD protection is because substantial amount of current needs to be dumped through the ESD protection device during an ESD event. A gate of the NMOS transistor 130 is connected to an output of the inverter 123 at a node N2. It is well known in the art that a potential between two terminals of a capacitor can not be changed instantly. When a logic high voltage is applied at the bonding pad 102, the voltage at a node N1 between the resistor 112 and the capacitor 114 ramps up from the VSS to the logic high voltage with a ramping rate depending on the values of the resistor 112 and capacitor 114. The inverter 123 serves merely as a voltage converting circuit, and particularly in this case, converts a logic low voltage at the node N1 to a logic high voltage at the node N2, and vice versa. With the initial logic low voltage at the node N1, hence the logic high voltage at the node N2, the NMOS transistor 130 is turned on, which drains off majority of the charge present at the bonding pad 102, therefore internal circuitries connected to the bonding pad 102 can be protected. As time goes by, the capacitor 114 is charged up with the voltage at the node N1 exceeds a threshold voltage of the inverter 123 and turns the voltage at the node N2 into a logic low voltage which turns off the NMOS transistor 130. Thereby, in a normal operation, the ESD protection circuit 130 does not interfere with normal functions of the bonding pad 102.

However, since the capacitor 114 has leakages through the gate oxide of the NMOS transistor, the voltage at the node N1 may not be high enough in a normal operation to completely turn off the NMOS transistor 130. It is undesirable for the ESD protection device 130 to consume current during the normal operation. To alleviate this gate oxide leakage problem, the capacitor 114 may use a thicker gate oxide. However, the thicker gate oxide with the constraint of the gate area decreases the capacitance of the capacitor 114. When the capacitor 114 is charged up too quickly, the turned-on period of the ESD protection device 130 will be shorter, thus the ESD protection circuit 100 will be less effective.

As such, what is desired is an ESD protection trigger circuit that can completely shut off the ESD protection device during a normal operation.

SUMMARY

This invention discloses a trigger circuit for an electrostatic discharge (ESD) protection device, the ESD protection device being turned on during an ESD event and being turned off during a normal operation, the trigger circuit comprises a voltage sensing circuit coupled to a bonding pad, the voltage sensing circuit being configured to produce a first predetermined voltage during a ESD event, and to produce a second predetermined voltage complimentary to the first predetermined voltage during a normal operation, and a voltage converting circuit having a positive feedback circuit and coupled between the voltage sensing circuit and the ESD protection device for converting the first predetermined voltage to a third predetermined voltage for turning on the ESD protection device, and for converting the second predetermined voltage to a fourth predetermined voltage for turning off the ESD protection device.

The voltage sensing circuit can be exemplary formed by a resistor and capacitor serially connected between the bonding pad and a ground. When the ESD protection device is a NMOS transistor, the voltage converting circuit can be formed by two cross-coupled inverters with one of the inverters serving as the positive feedback circuit.

The construction and method of operation of the invention, however, together with additional objectives and advantages thereof will be best understood from the following description of specific embodiments when read in connection with the accompanying drawings.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein. It should be noted that the features illustrated in the drawings are not necessarily drawn to scale.

DESCRIPTION

The present invention discloses an electrostatic discharge (ESD) protection trigger circuit with a positive-feedback so that the trigger circuit can completely shut off the ESD protection circuit during a normal operation.

Figure 2:
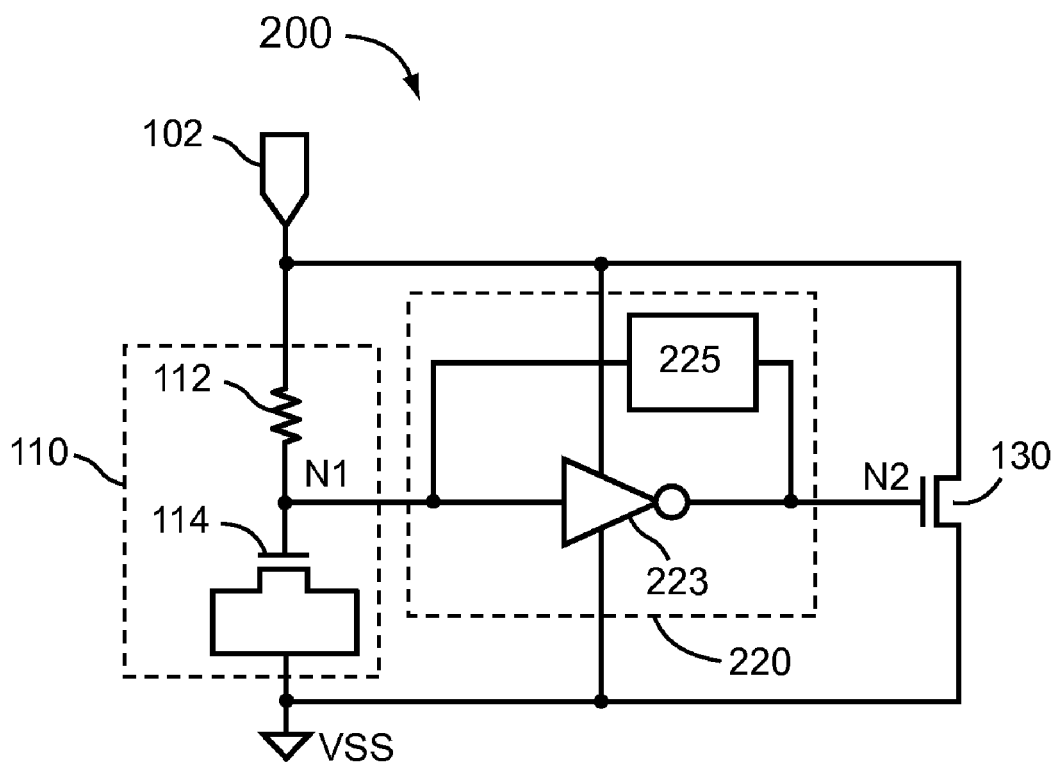
FIG. 2 is a schematic diagram illustrating an ESD protection circuit with a positive-feedback trigger circuit according to one embodiment of the present invention.

FIG. 2 is a schematic diagram illustrating an ESD protection circuit 200 with a positive-feedback trigger circuit according to one embodiment of the present invention. In certain aspects, the ESD protection 200 is identical to the conventional ESD protection circuit 100. Such aspects include the voltage sensing circuit 110, and the ESD protection device 130. The voltage sensing circuit 110 is exemplarily comprised of the resistor 112 and the capacitor 114 serially connected between the bonding pad 102 and the VSS. The operations of the voltage sensing circuit 110 have already been described in the background section and require no further discussion.

Referring again to FIG. 2, the ESD protection device 130 is also implemented by a NMOS transistor here. A gate of the NMOS transistor 130 denoted by the node N2 is coupled to the node N1 of the voltage sensing circuit 110 through a voltage converting circuit 220. Herein the term "coupled" means directly connected or connected through another component, but where that added another component supports the circuit function. According to the embodiment of the present invention, the voltage converting circuit 220 is implemented by an inverting circuit, i.e., an inverter 223, with a positive-feedback circuit 225. It is well known in the art that the positive feedback circuit 225 will force the voltages at the nodes N1 and N2 to their respective rail voltages in a steady state. For instance, in a normal operation, the bonding pad 102 is applied a logic high voltage VDD, the voltage at the node N1 will be forced to the VDD by the feedback circuit 225, and the voltage at the node N2 will be forced to the VSS by the inverter 223, even though the capacitor 114 may have some leakage. With the voltage at the N2 reaches the full VSS, the NMOS transistor 130 will be completely turned off, therefore, the leakage therein is avoided. Since the capacitor 114 serves to sense the voltage at the bonding pad 102, the size of the capacitor 114 can be made small, plus the current limiting resistor 112, the leakage through the capacitor 114 is insignificant.

Referring again to FIG. 2, in an ESD event when a sudden and momentary electric current that flows into a bonding pad due to a static charge discharge, the positive feedback circuit 225 makes the voltages at the node N1 and N2 harder to topple to their respective opposite voltages, thus the ESD protection device 130 can stay on longer and shun more ESD current.

Figure 3:
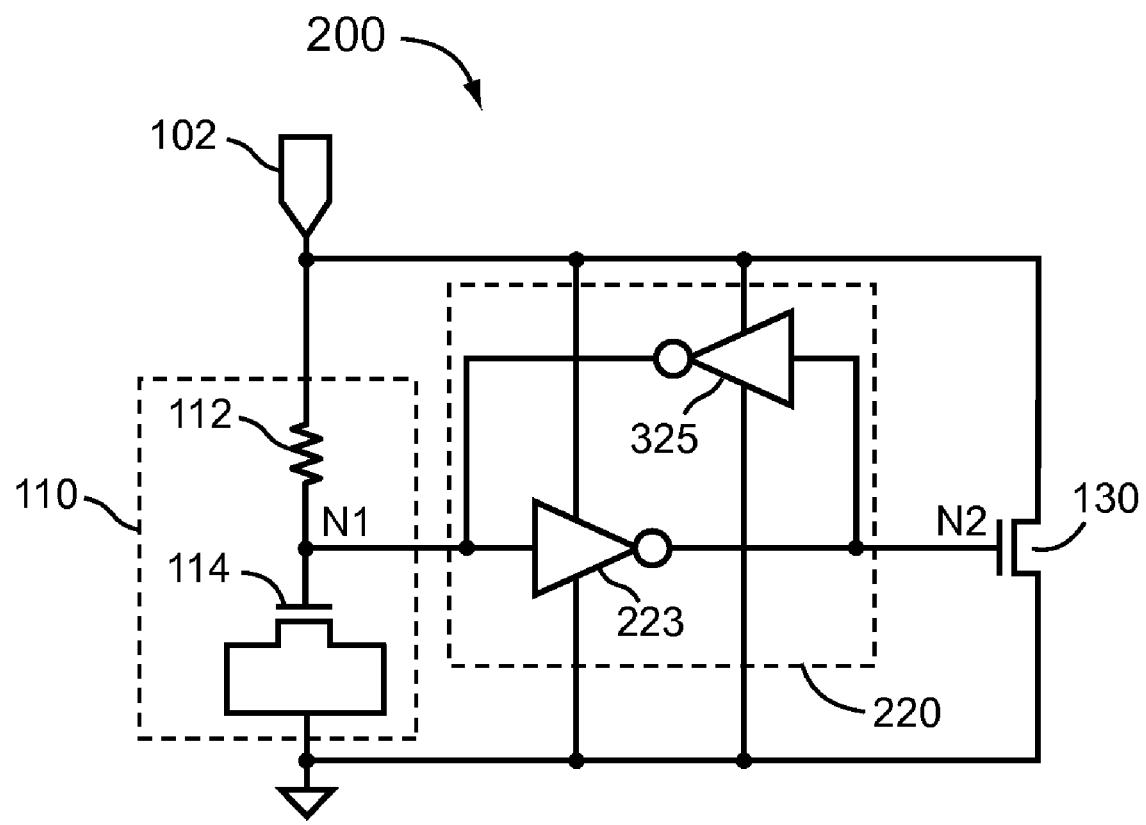
FIG. 3 is a schematic diagram illustrating an implementation of the positive-feedback trigger circuit.

FIG. 3 is a schematic diagram illustrating an implementation of the positive-feedback circuit 225 of FIG. 2. Since the forward signal path is comprised of the inverter 223, the positive feedback circuit 225 of FIG. 2 can be simply implemented by an inverter 325. The stronger the inverter 325 is the greater the feedback effect is, i.e., the ESD protection device 130 will be turned on longer in an ESD event, and remain turned off more stably during a normal operation.

Figure 1:
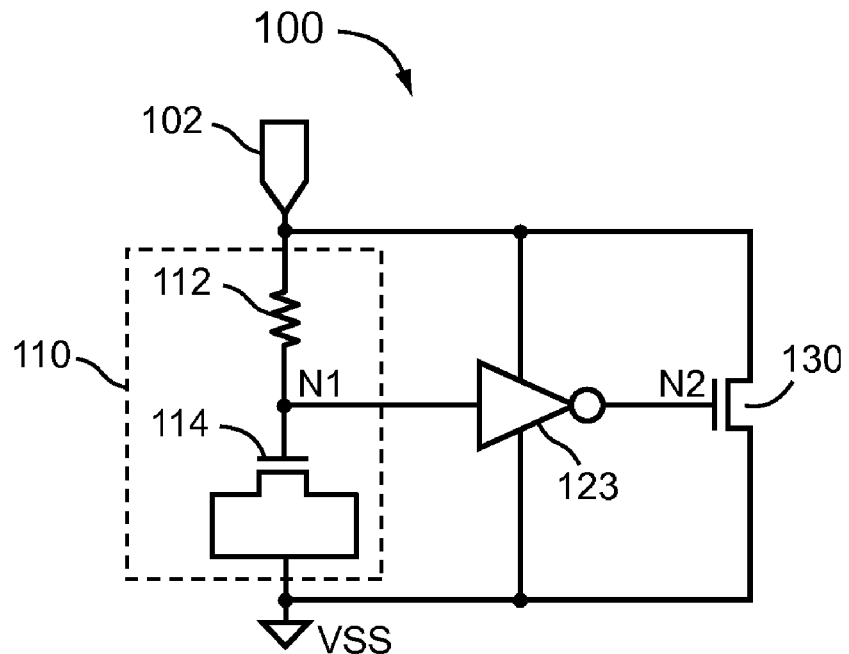
FIG. 1 is a schematic diagram illustrating a conventional ESD protection circuit.

Although only one inverter 223 in the forward signal path, and only one inverter 325 in the feedback signal path between the node N1 and the node N2 are illustrated in FIG. 3, one skilled in the art would realize that any odd number of inverters can be used in the forward signal path between the node N1 and N2. Similarly, any odd number of inverters can be used in the feedback signal path between the node N1 and the node N2. For instance, five serially connected inverters can be used in place of the single inverter 223 of FIG. 3, while three serially connected inverters can be used in place of the single inverter 325 of FIG. 3. ESD devices such as the NMOS transistor 130 of FIG. 1 is normally of very large size, multiple serially connected inverters are used to drive such devices so that proper fan-out is maintained.

Figure 4:
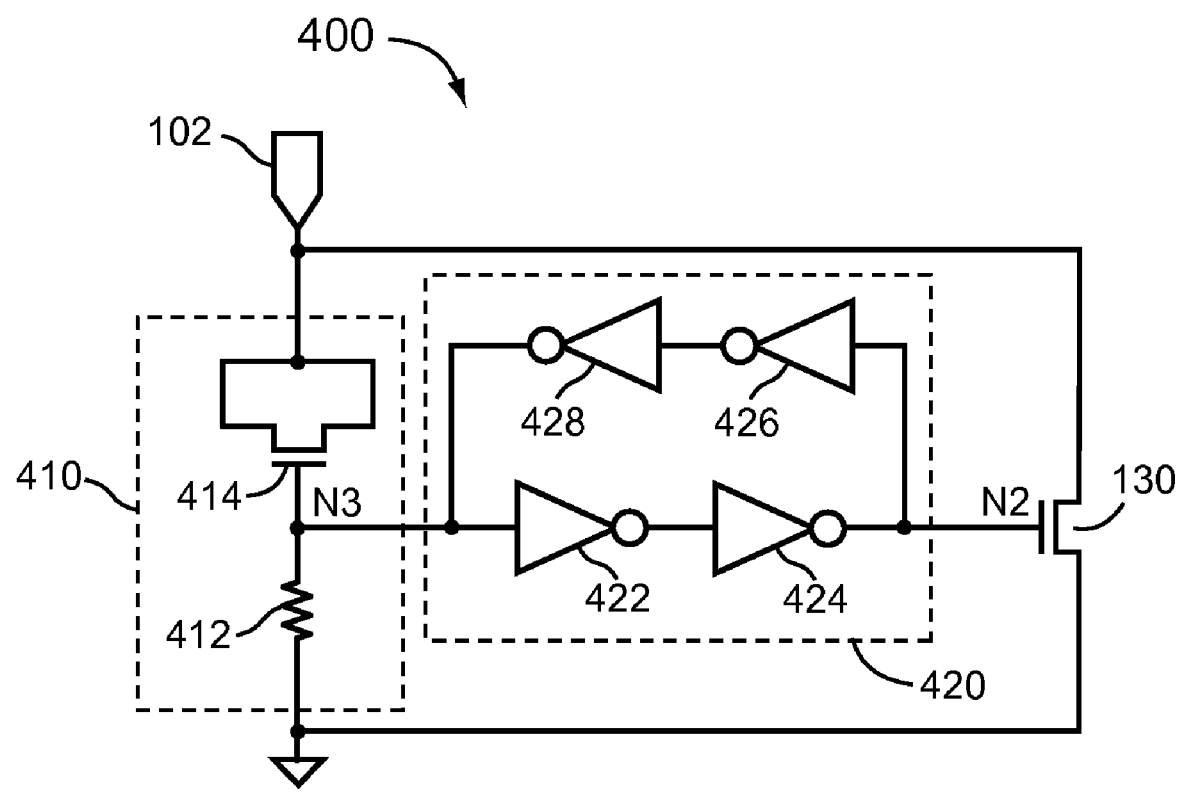
FIG. 4 is a schematic diagram illustrating an alternative implementation of the positive-feedback trigger circuit.

FIG. 4 is a schematic diagram illustrating an alternative implementation of the positive-feedback trigger circuit. A voltage sensing circuit 410 comprises a capacitor 414 and a resistor 412. The capacitor 414 is connected between the bonding pad 102 and a voltage sensing node N3. The resistor 412 is connected between the node N3 and the VSS. In an ESD event, the initial voltage at the node N3 is the logic high voltage. In order to turn on the ESD device 130 at the onset of the ESD event, an even number of serially connected inverters is needed to convert the logic high voltage at the node N3 to another logic high voltage at the node N2. In order to maintain a positive feedback, also even number of serially connected inverters is needed to feedback the voltage at the node N2 to the node N3. As illustrated in FIG. 4, two serially connected inverters 422 and 424 form the forward signal path from the node N3 to the node N2, and two serially connected inverters 426 and 428 form the feedback signal path from the node N2 to the node N3.

Referring again to FIG. 4, during a normal operation, the capacitor 414 is charged up, and the voltage at the node N3 is close to the VSS. Then the voltage at the node N2 is at the VSS, so that the ESD NMOS transistor 130 is turned off, and the internal circuit will not be affected thereby.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A trigger circuit for an electrostatic discharge (ESD) protection device, the ESD protection device being an NMOS transistor being turned on during an ESD event and being turned off during a normal operation, the trigger circuit comprising:

a voltage sensing circuit coupled to a bonding pad, the voltage sensing circuit being configured to produce a first predetermined voltage during an ESD event, and to produce a second predetermined voltage complementary to the first predetermined voltage during a normal operation, wherein the voltage sensing circuit comprises a capacitor connected to the bonding pad and a resistor connected between the capacitor and a ground; and a voltage converting circuit coupled to a first node between the capacitor and the resistor for converting the first predetermined voltage to a third predetermined voltage for turning on the NMOS transistor during an ESD event, and for converting the second predetermined voltage to a fourth predetermined voltage for turning off the NMOS transistor during a normal operation, the voltage converting circuit including:

an even number of inverters connected in series between the first node and a gate of the NMOS transistor; and a positive feedback circuit connected between the gate of the NMOS transistor and the first node for preventing a leakage current flowing through the NMOS transistor during a normal operation.

2. The trigger circuit of claim 1, wherein the capacitor is formed by a metal-oxide-semiconductor (MOS) device with a source and drain tied together forming one terminal and a gate forming another terminal of the capacitor.

3. A trigger circuit for an electrostatic discharge (ESD) protection N-type metal-oxide-semiconductor (NMOS) transistor, the trigger circuit comprising:

a voltage sensing circuit coupled to a bonding pad, the voltage sensing circuit being configured to produce a logic low voltage during an ESD event, and to produce a logic high voltage during a normal operation; and a voltage converting circuit coupled between the voltage sensing circuit and a gate of the ESD protection NMOS transistor for converting the logic low voltage to a logic high voltage for turning on the ESD protection NMOS transistor, and for converting the logic high voltage to a logic low voltage for turning off the ESD protection NMOS transistor, wherein the voltage converting circuit includes:

an even number of inverter connected in series; and a positive feedback circuit including at least two inverters connected in series between the gate of the ESD protection NMOS transistor and the voltage sensing circuit for preventing a leakage current flowing through the ESD protection NMOS transistor during a normal operation.

4. The trigger circuit of claim 3, wherein the voltage sensing circuit comprises a resistor and a capacitor serially connected between the bonding pad and a ground, wherein the voltage converting circuit is coupled to a common node between the resistor and the capacitor.

5. The trigger circuit of claim 4, wherein the capacitor is formed by a metal-oxide-semiconductor (MOS) device with a source and drain tied together forming one terminal and a gate forming another terminal of the capacitor.

* * * * *